J. A. MILLER.
FISH TRAP.
APPLICATION FILED MAY 9, 1916.
1,246,637.
Patented Nov. 13, 1917.
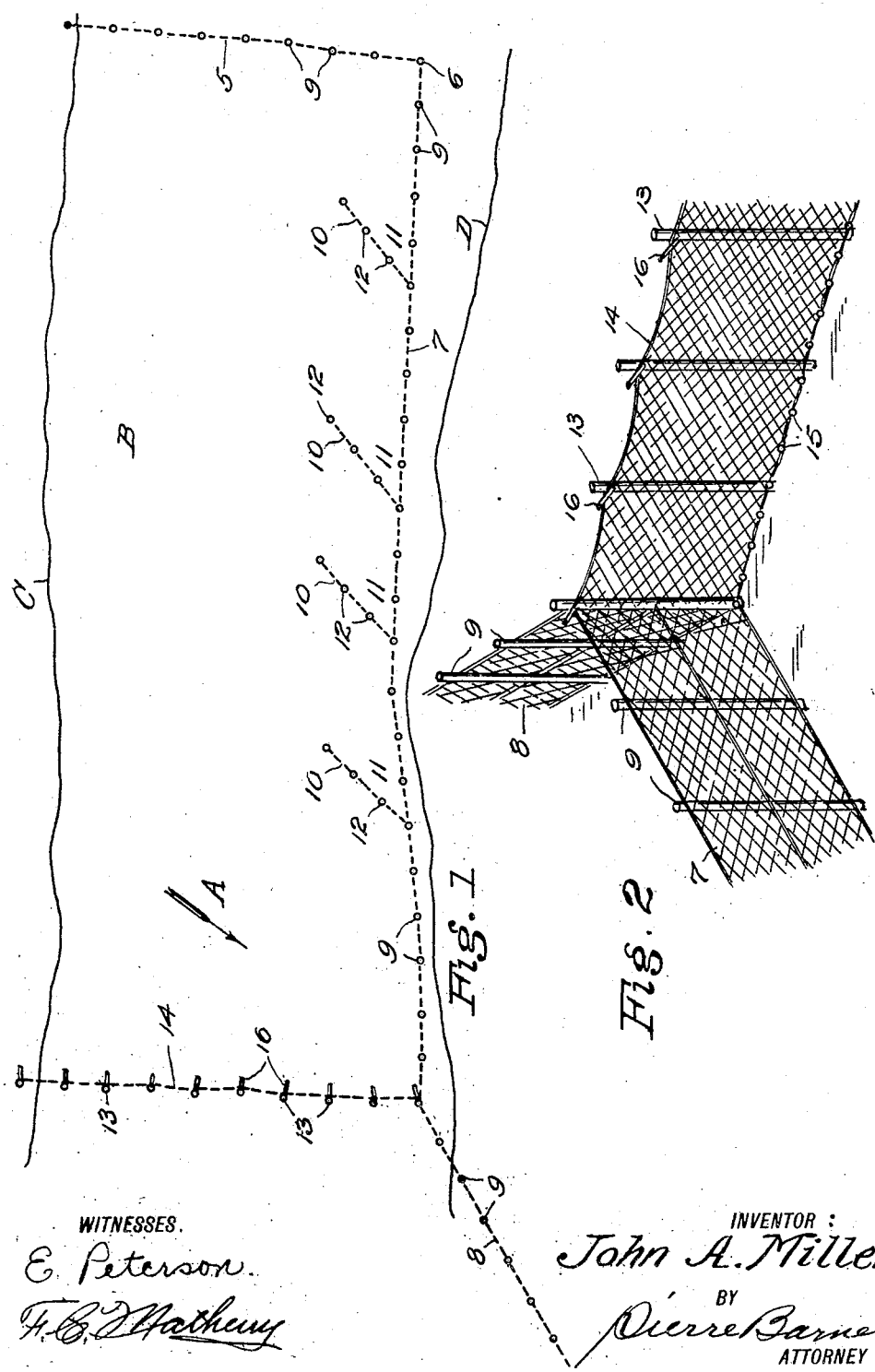
WITNESSES.
E. Peterson
F. C. Matheny
INVENTOR:
John A. Miller
BY
Pierre Barnes
ATTORNEY

UNITED STATES PATENT OFFICE.

JOHN A. MILLER, OF BELLINGHAM, WASHINGTON.

FISH-TRAP.

1,246,637.  Specification of Letters Patent.  Patented Nov. 13, 1917.

Application filed May 9, 1916. Serial No. 96,303.

*To all whom it may concern:*

Be it known that I, JOHN A. MILLER, a citizen of the United States, residing at Bellingham, in the county of Whatcom and State of Washington, have invented certain new and useful Improvements in Fish-Traps, of which the following is a specification.

The object of my invention is to produce an inexpensively constructed fish-trap which is particularly adapted for use in situations like the shores of bays or inland waters where there is a relatively great variation in the elevation of the water surface due to tides, and whereby great quantities of fish may be readily impounded and recovered.

With these ends in view, the invention consists in the novel construction, adaptation and combination of parts, as will be hereinafter described and claimed.

In the accompanying drawings, Figure 1 is a plan view of a fish-trap embodying the present invention, and Fig. 2 is a perspective view of a portion of the same taken in the direction indicated by arrow A.

A trap according to my invention is located on a beach or spit denoted by B which is submerged to a shore-line C at high water and is exposed to a line D at low water.

The trap proper consists in a wall having an end portion 5 hereinafter designated as the end wall, which extends from shore-line C to a bend 6 and thence as at 7, hereinafter designated as the front wall arranged approximately parallel to the shore line and in a direction from the end wall opposite to that at which the water will flow during flood tides.

From the outer end of the front wall is a lead or guide-wall 8 of suitable length to reach into deep water, and disposed in angular relation with respect to the shore-line C to afford therewith a converging passageway through which fish traveling with the flood will be directed into the space between said front wall and shore line C.

The aforesaid wall or walls are desirably constructed of mesh or woven wire screens which are supported by piles 9 driven into the ground at suitable distances apart and extending from the ground surface to above the water surface at high water.

From the inner side of said front wall project a series of baffles 10 disposed to provide angular shaped pockets 11 at the sides of the baffles nearest to said end wall. These baffles are constructed of screens supported on piles 12.

Between the shore line C and the outer end of the wall 7 is a row of piles 13 to hold a curtain of webbing 14 which is raised and held above the water level to enable the fish to enter the trap during flood tide and is subsequently lowered to prevent their escape after a sufficient number are impounded or when the tide turns.

For this purpose the lower edge of the webbing is weighted by bodies 15 of lead or other heavy material and is suspended from its upper edge to bracket arms 16, Fig. 2, upon which the webbing may be deposited when raised into inoperative position.

The operation of the trap may be explained as follows:

With the curtain 14 raised, the fish will be directed by the lead 8 into the inclosure between the trap walls and the shore. When within the inclosure and for any reason the fish become frightened, as by encountering the end wall 5, they will habitually turn toward deep water in their endeavor to escape. They are, however, stopped by the front wall 7 to be turned thereby in one lateral direction or the other; should they proceed toward the trap entrance, their travel will again be interrupted by the baffles 10 which cause them to turn back or, at least, remain in the various pockets 11.

When a "run" of fish is completed, the curtain webbing 14 is lowered to close the trap opening. The fish thus impounded are collected from the ground surface after the water recedes therefrom.

What I claim, is—

A fish trap constructed adjacent to a shore line and anchored thereon, comprising an end wall extending from the shore line substantially at right angles thereto, the front wall extending from the outer end of said end wall in a direction approximately parallel to the shore line, a plurality of spaced baffles defining separate pockets extending toward the shore line from said front wall in angular relations to the latter, the end of said wall remote from said end wall terminating at a distance from the shore line, a lead continuing therefrom, and a removable curtain of webbing for closing the space between the referred to end of the front wall and the shore line.

Signed at Seattle, Washington, this 18th day of March, 1916.

JOHN A. MILLER.

Witnesses:
 HORACE BARNES,
 E. PETERSON.

Copies of this patent may be obtained for five cents each, by addressing the "Commissioner of Patents, Washington, D. C."